United States Patent
Sun et al.

(10) Patent No.: US 8,489,822 B2
(45) Date of Patent: *Jul. 16, 2013

(54) PROVIDING A DIRECTORY CACHE FOR PERIPHERAL DEVICES

(75) Inventors: Andrew Y. Sun, Cupertino, CA (US); Henk G. Neefs, Santa Clara, CA (US); Rahul Pal, Bangalore (IN); Manoj K. Arora, Bangalore (IN); Ravindra P. Saraf, Amaravati (IN)

(73) Assignee: Intel Corporation, Santa Clara, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/953,120

(22) Filed: Nov. 23, 2010

(65) Prior Publication Data

US 2012/0131282 A1 May 24, 2012

(51) Int. Cl.
*G06F 13/00* (2006.01)

(52) U.S. Cl.
USPC .......................................... 711/145; 711/141

(58) Field of Classification Search
USPC .................................. 711/141, 145
See application file for complete search history.

(56) References Cited

U.S. PATENT DOCUMENTS

| | | | |
|---|---|---|---|
| 5,530,832 A | 6/1996 | So et al. | |
| 6,434,672 B1 | 8/2002 | Gaither | |
| 6,598,123 B1 | 7/2003 | Anderson et al. | |
| 6,782,452 B2 | 8/2004 | Williams | |
| 6,842,830 B2 | 1/2005 | Khare et al. | |
| 6,959,364 B2 | 10/2005 | Safranek et al. | |
| 6,976,131 B2 | 12/2005 | Pentkovski et al. | |
| 7,093,079 B2 | 8/2006 | Quach et al. | |
| 7,117,389 B2 | 10/2006 | Luick | |
| 7,167,957 B2 | 1/2007 | Khare et al. | |
| 2002/0053004 A1 | 5/2002 | Pong | |
| 2004/0039880 A1 | 2/2004 | Pentkovski et al. | |
| 2005/0066079 A1 | 3/2005 | Luick | |
| 2006/0053258 A1 | 3/2006 | Liu | |
| 2006/0117148 A1 | 6/2006 | Liu et al. | |
| 2007/0005909 A1 | 1/2007 | Cai et al. | |
| 2007/0079075 A1* | 4/2007 | Collier et al. | 711/141 |
| 2007/0233965 A1 | 10/2007 | Cheng et al. | |
| 2007/0233966 A1 | 10/2007 | Chinthanmani et al. | |
| 2007/0239941 A1 | 10/2007 | Looi et al. | |
| 2007/0294481 A1 | 12/2007 | Hoover | |
| 2008/0005485 A1 | 1/2008 | Gilbert et al. | |
| 2009/0300289 A1 | 12/2009 | Kurts | |
| 2011/0161585 A1* | 6/2011 | Kottapalli et al. | 711/122 |
| 2012/0047333 A1* | 2/2012 | Kottapalli et al. | 711/146 |

FOREIGN PATENT DOCUMENTS

GB 2 444 818 A 6/2008

\* cited by examiner

*Primary Examiner* — Reba I Elmore
(74) *Attorney, Agent, or Firm* — Trop, Pruner & Hu, P.C.

(57) ABSTRACT

In one embodiment, the present invention includes a processor having at least one core and uncore logic. The uncore logic can include a home agent to act as a guard to control access to a memory region. Either in the home agent or another portion of the uncore logic, a directory cache may be provided to store ownership information for a portion of the memory region owned by an agent coupled to the processor. In this way, when an access request for the memory region misses in the directory cache, a memory transaction can be avoided. Other embodiments are described and claimed.

20 Claims, 6 Drawing Sheets

PROVIDING A DIRECTORY CACHE FOR PERIPHERAL DEVICES

BACKGROUND

In modern computer systems, it is common to have multiple processors both in the way of multiple cores of a multi-core processor, and in the way of multiple processor sockets, each potentially including multiple cores. In addition, other system components such as various semiconductor devices, e.g., peripheral devices, controllers, chipsets and so forth are also present in a typical system. To enable the various components to interact with efficiency and commonality of data, many systems incorporate some type of cache coherency protocol. That is, many systems have a protocol in place to allow multiple copies of a given datum to be present in various locations of a system such as a system memory as well as one or more caches that can be associated with different components of the system.

Different cache coherency protocols exist. One common protocol implements a directory that is typically stored in system memory. This directory maintains information regarding the location and status of data present in the various caches or other structures of the system. To maintain coherency of the data and allow for accurate updating of state information, various communications occur according to this cache coherency protocol.

Because the directory is typically stored in memory, memory bandwidth is consumed by such cache coherency communications. This memory bandwidth consumption can negatively impact application performance, particularly in a multiprocessor system where data is shared by multiple components.

DETAILED DESCRIPTION

In various embodiments, a directory cache may be provided within a processor to limit the amount of memory traffic needed to maintain coherency in a system. While the scope of the present invention is not limited in this regard, in many embodiments this directory cache may be stored in a so-called uncore portion of a processor. Further, to provide for optimization, only information regarding certain types of data may be stored in this directory cache. Specifically, in one embodiment this directory cache may be used to store information regarding ownership of data by one or more peripheral devices, e.g., as coupled to the processor via a chipset component such as an input/output (I/O) hub. By providing this directory cache, embodiments may avoid the need to transmit transactions to a memory in which a full version of the directory is stored. More specifically, embodiments may be used to prevent transmission of a memory request or cache coherence message to a memory including a directory. This message prevention can occur when it is determined that the requested data is not represented in the directory cache, meaning that a miss occurs in the directory cache, such that it can be established that requested data is not owned by a peripheral device represented by the I/O hub.

As will be described further below, entries may be stored into this directory cache responsive to particular transactions received from the I/O hub. These transactions may be those that seek ownership of requested data by an agent represented by the I/O hub such as a peripheral device coupled to the I/O hub. Responsive to such a transaction, an entry may be established in the directory cache, and the transaction may also be forwarded to the memory so that an entry in the directory may also be formed to identify this request as well as to provide the requested data back to the requester (assuming it is present in the memory in a valid state).

Then, on a subset of transactions that do not require a memory read or write, a directory read that would otherwise be performed with a memory read can be avoided. For example, when a later request from a local core or other processor agent that does not require a memory read/write (e.g., a request for ownership of a given memory line) is received in the directory cache, it can be determined whether a corresponding directory entry is present. In cases of a miss, the bandwidth consumed by requesting information from the directory present in system memory can be avoided. If instead a hit occurs, a request may be made to obtain the requested state information from the memory. Note that instead on typical memory reads, the directory can be read without any additional penalty or latency, and thus access to the directory cache may not be performed for such transactions.

Figure 1:
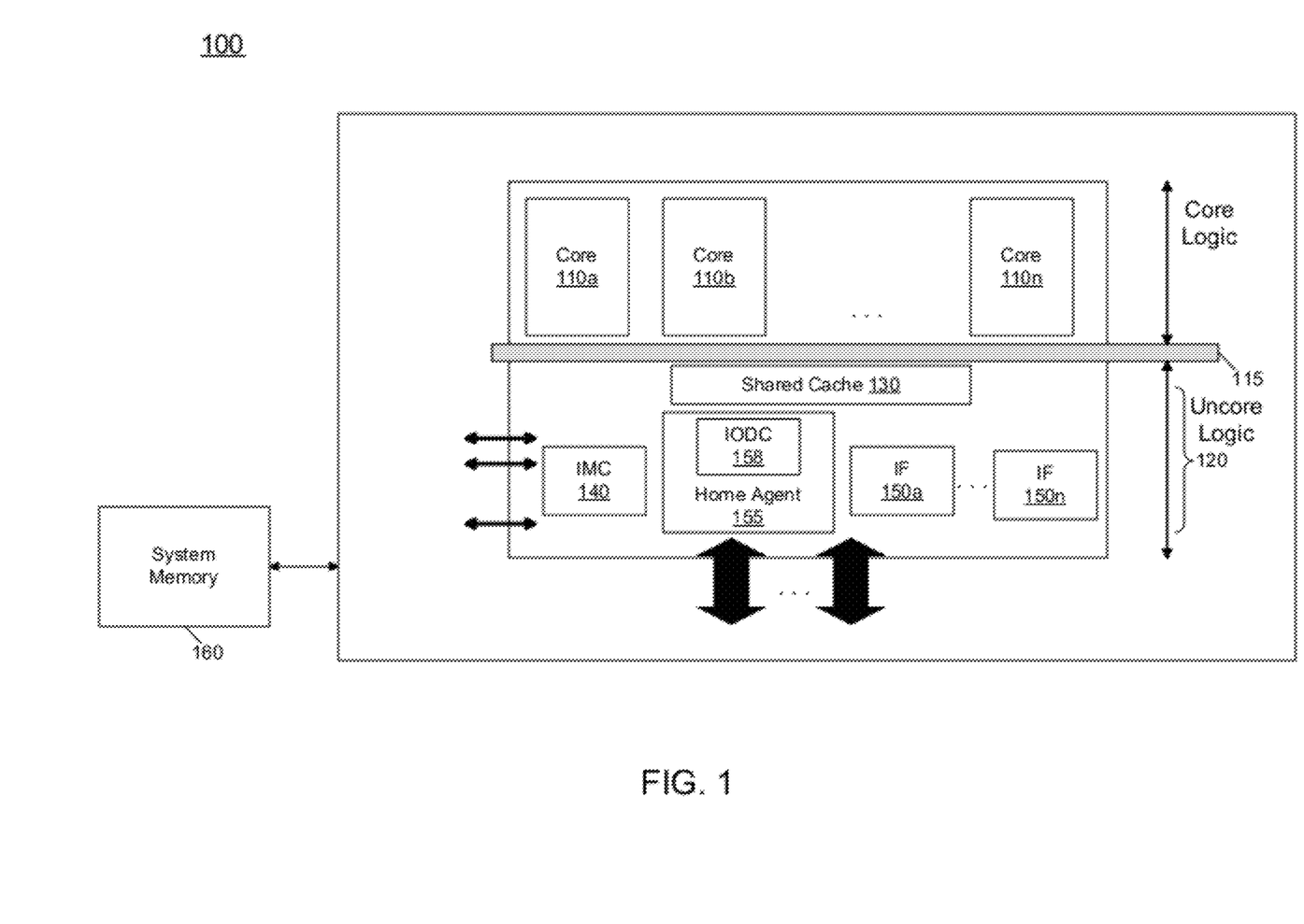
FIG. 1 is a high level block diagram of a processor in accordance with an embodiment of the present invention.

Referring now to FIG. 1, shown is a high level block diagram of a processor in accordance with an embodiment of the present invention. As shown in FIG. 1, processor 100 may be a multicore processor including a plurality of cores $110_a$-$110_n$. Understand that these cores may be physical processors in that they may include various components such as front end units, execution units and back end units, as will be discussed in more detail below.

The various cores may be coupled via an interconnect 115 to an uncore logic 120 which is logic of the processor outside of the core that includes various components. Uncore 120 may include a shared cache 130 which may be a last level cache. In addition, the uncore may include an integrated memory controller 140, various interfaces 150 and a home agent 155.

Home agent 155 may be responsible for guarding a portion of a system memory 160. For example, home agent 155 may perform various processing for requests directed to a portion of system memory 160 coupled to processor 100. This region of system memory may, for example, correspond to one or more dual in-line memory modules (DIMMs). More specifically, home agent 155 may receive incoming requests that are directed to this region and, via logic present in the home agent, resolve conflicts and maintain ordering of transactions among other operations. Accordingly, home agent 155 may include logic to receive requests from various components or agents and route these requests as appropriate to the corresponding region of memory. To perform its operations, the home agent may receive information from a directory present in the system memory that indicates the location and states of data in various caching agents of the system.

In accordance with various embodiments, home agent 155 may include a directory cache 158 which may provide for storage of directory information corresponding to at least parts of the data stored in the corresponding system memory region managed by home agent 155. Different amounts and types of information may be stored in directory cache 158 in different embodiments. For example, in a most basic implementation, only an address (or a portion of an address) corresponding to a data request may be stored within the directory cache. In another embodiment, in addition to address information, additional data such as state information of the corresponding line may also be stored in the directory cache. Yet in further embodiments, in addition to all of this information, a copy of the data present in the line may also be stored.

While not limited in this regard, in some implementations this directory cache may be of relatively limited size and may be configured to store entries only for addresses within the system memory that are owned by a peripheral device represented by an I/O hub (not shown in FIG. 1). Thus as seen in FIG. 1, in this embodiment the directory cache 158 may be referred to as an I/O directory cache (IODC) as it is to store information for addresses owned by one or more peripheral devices coupled to an I/O hub or other interface to the processor. In one embodiment, there may be a 1:1 correspondence between entries in the IODC and available memory transactions (e.g., RTIDs) from the I/O hub. For example, in one embodiment there may be a maximum of 64 available memory transactions from the I/O hub and thus there may be a corresponding 64 entries within the IODC, although the scope of the present invention is not limited in this regard. In other implementations, many more entries may be available in the IODC to provide for additional storage for requests from other devices, including additional I/O hubs, other peripheral devices directly coupled to the processor or so forth.

Still with respect to FIG. 1, interfaces 150 may enable communication with various off-chip components such as the I/O hub, other peripheral devices, mass storage and so forth. While shown with this particular implementation in the embodiment of FIG. 1, the scope of the present invention is not limited in this regard.

Figure 2:
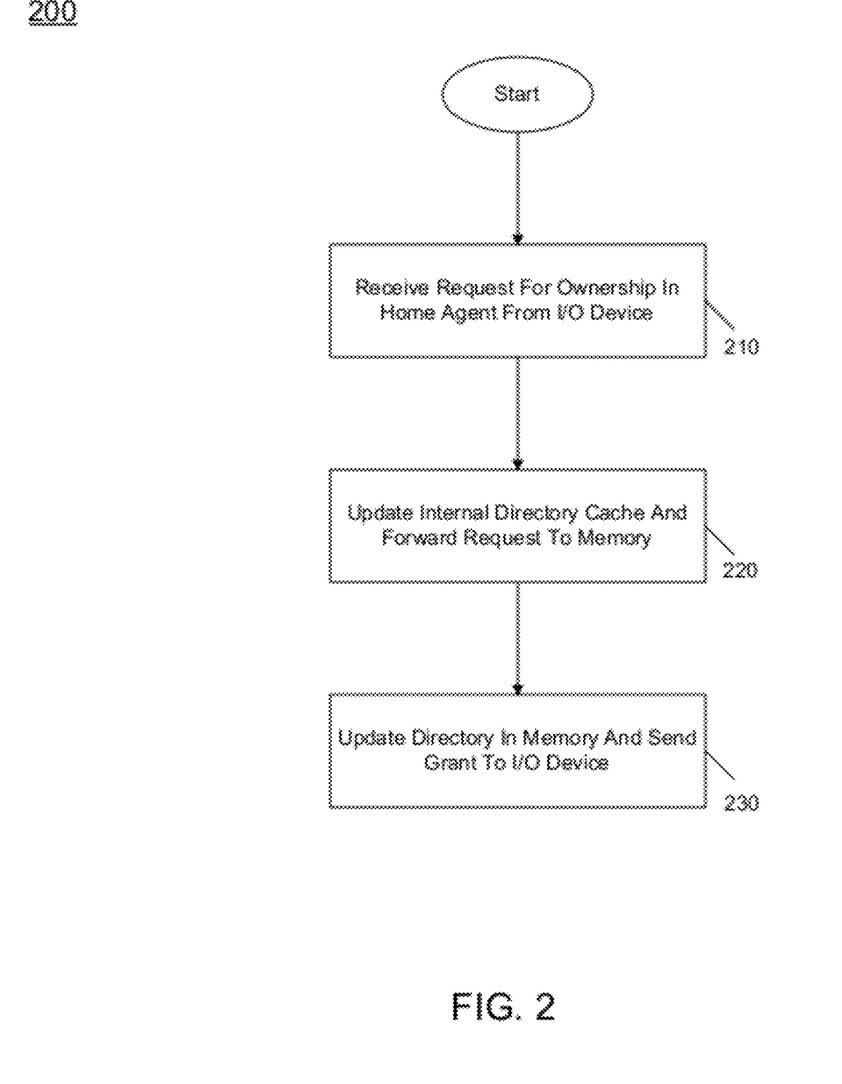
FIG. 2 is a flow diagram of a method in accordance with one embodiment of the present invention.

Referring now to FIG. 2, shown is a flow diagram of a method in accordance with one embodiment of the present invention. More specifically, method 200 shown in FIG. 2 may be used to create an entry in a directory cache for an incoming memory request from an I/O device. As seen, method 200 may begin by receiving a request for ownership in the home agent, e.g., from an I/O device (block 210). This request for ownership may correspond to a memory request from the I/O device in which the device seeks to read data present at an address in memory and maintain that data in an ownership state (exclusively) such that it can then update or modify the data value, without negatively impacting cache coherency. In one embodiment, this request may be an invalidate-to-exclusive (InvItoE) request so that the requesting I/O device (via the I/O hub) obtains ownership of the data at this address.

Accordingly on receipt of such a request, which may be directed to the home agent associated with the requested address, the home agent may update its internal directory cache and also forward the request to memory (block 220). The updating of the internal directory cache may be by allocating an entry in the directory cache for this address and setting a state of the entry for the address. In an embodiment in which there is not a 1:1 mapping between number of memory lines the I/O hub can own and the number of entries in the directory cache, if needed, the home agent may first evict an entry if there are no available entries. Instead in 1:1 mapping cases if the I/O hub issues a new request, then the line located at that request number is freed and that entry of the directory cache may be re-used for the new request. In either event, on allocation of an entry for a new transaction, the state of the entry may be set to represent ownership of this address by the I/O device. In addition, the home agent can forward this request along to memory, e.g., via a memory interconnect that couples the memory to the processor.

Still referring to FIG. 2, control passes to block 230, where the directory in the memory may be updated. In addition, the home agent may send a grant message back to the I/O device to indicate it now has ownership of the requested location. Thus at this point, the state identifying ownership of the data at this address by the I/O device is coherent in both the directory stored in system memory as well as in the directory cache stored in the home agent. While shown with this particular method in the embodiment of FIG. 2, understand the scope of the present invention is not limited in this regard. For example, in other embodiments the directory cache may be located elsewhere in a processor, for example, another portion of the uncore such as shared cache 130. In another embodiment, the directory in memory may be eliminated, and the directory cache alone may be used, which may have the potential to improve input/output bandwidth.

Figure 3:
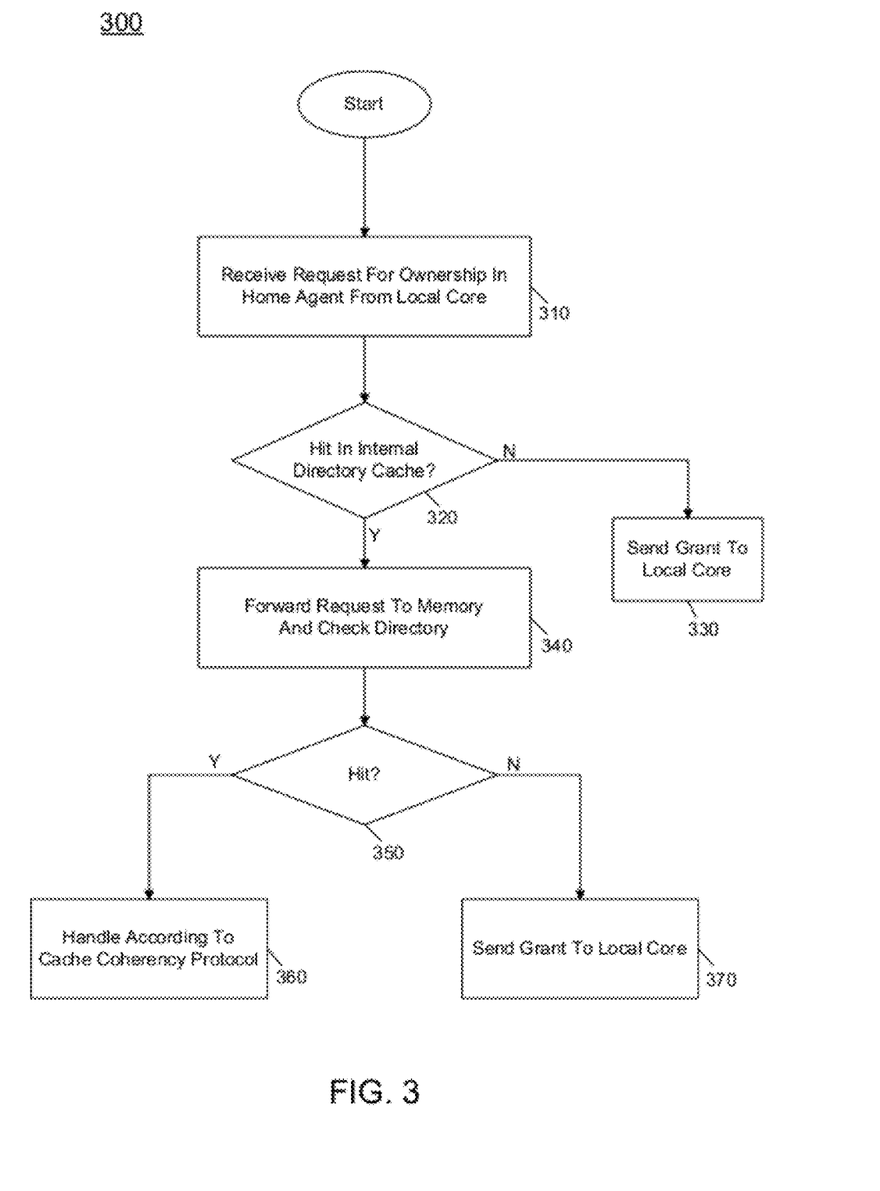
FIG. 3 is a flow diagram of a method for handling a request from a core in accordance with an embodiment of the present invention.

Referring now to FIG. 3, shown is a flow diagram of a method for handling a request from a core in accordance with an embodiment of the present invention. As seen in FIG. 3, method 300 may begin by receiving a request for ownership in the home agent from a local core (block 310). That is, this request may be received from a core present in the same processor socket as the home agent. However, understand the scope of the present invention is not limited in this fashion and in other embodiments, incoming core requests may be received in the home agent from another processor socket. This request, such as described above with regard to the request from an I/O device, may be in the form of an InvItoE request, in one embodiment.

Responsive to receipt of this request, it may be determined whether a hit occurs in the internal directory cache of the home agent, as indicated at diamond 320. If not, control passes to block 330, where a grant may be sent back to the local core. More specifically, this response to the local core may indicate that the core can have exclusive access to the requested data, by way of a grant exclusive (GntE), in one embodiment. This is so, as by way of the miss in the directory cache the home agent can determine that there is no corresponding ownership by a peripheral device (and similarly no entry present in the directory in system memory). Note that if the data is in another local core, the shared cache may perform a snoop. Depending on the state of the cache line, the shared cache may be able to complete the InvItoE transaction without sending any transaction to the home agent. Note that in multiprocessor implementations, it is possible that this grant message may be delayed until the home agent receives snoop responses from other processor sockets. That is, because a directory can be distributed across local portions of system memory coupled to each processor, a grant is not provided to a requesting local core until the home agent has received responses to snoop requests from the other processor sockets.

Still referring to FIG. 3, if instead at diamond 320 it is determined that a hit does occur to an entry in the internal directory cache, this means that a peripheral device represented by the I/O hub owns the data at the requested address. Accordingly, control passes to block 340 so that the request from the local core can be forwarded to memory to check the directory to confirm that no change in state has occurred for this address.

This request message is received by the directory in memory, which may determine whether a hit occurs (diamond 350). If so, control passes to block 360 where this request may be handled according to a given cache coherency protocol. More specifically, assume that the directory indicates that the data is present in an exclusive state (e.g., ownership state) by an I/O device. Accordingly, the cache coherency protocol will cause transmission of an invalidation message to the I/O device to cause the data to be invalidated in the I/O device and in turn to provide the updated data from the I/O device for storage in system memory as well as to be provided to the requesting core. Note that when a hit occurs in the directory, the home agent may be responsible for snooping the I/O device. Depending on line state and conflict resolution protocol implemented in the system, the data may be forwarded from the I/O device directly to the core, or the data forwarded from I/O device to home agent to core, or the data may simply be sent from the home agent (and the I/O device invalidates its copy). The home agent can optimize this transaction for latency by directly sending the snoop to the I/O hub responsive to the directory cache lookup.

Note that the flow chart of FIG. 3 assumes that there is a directory maintained in memory. In an embodiment in which the directory is not maintained in memory, the directory cache may be used to resolve conflicts. In general in this case, diamond 320, and boxes 330 and 340 may be removed, and the operation of diamond 350 would correspond to the hit determination of diamond 320.

Otherwise, if the requested address misses in the directory, control passes from diamond 350 to block 370 where a grant message may be sent to the local core. That is, since the address corresponding to the request from the local core is not present in the directory, this means that the requested data is not owned by or in use by an agent associated with this processor. Accordingly, the local core that is requesting access may receive exclusive ownership of the data.

Note that this situation may occur, for example, when data corresponding to an entry of the directory cache was previously evicted from the peripheral device. Thus although accurate state information is present in the directory (and accordingly, the entry that corresponded to this evicted data from the peripheral device was evicted from the directory), in some embodiments to provide for simpler operation, the IODC does not clear entries on such evictions from the directory. This is so, as in various implementations, IODC hits may be expected to be rare so thus no performance degradation may occur. Furthermore, any false hit in the IODC, although it may cause a minimal performance impact, does not affect functional correctness. In other embodiments, an optimization may occur by providing for evictions to occur within the IODC to thus clear entries from the IODC when the corresponding data has been evicted from the owning peripheral device (and thus also state information in the directory updated accordingly). While shown with this particular implementation in the embodiment of FIG. 3, understand the scope of present invention is not limited in this regard.

Figure 4:
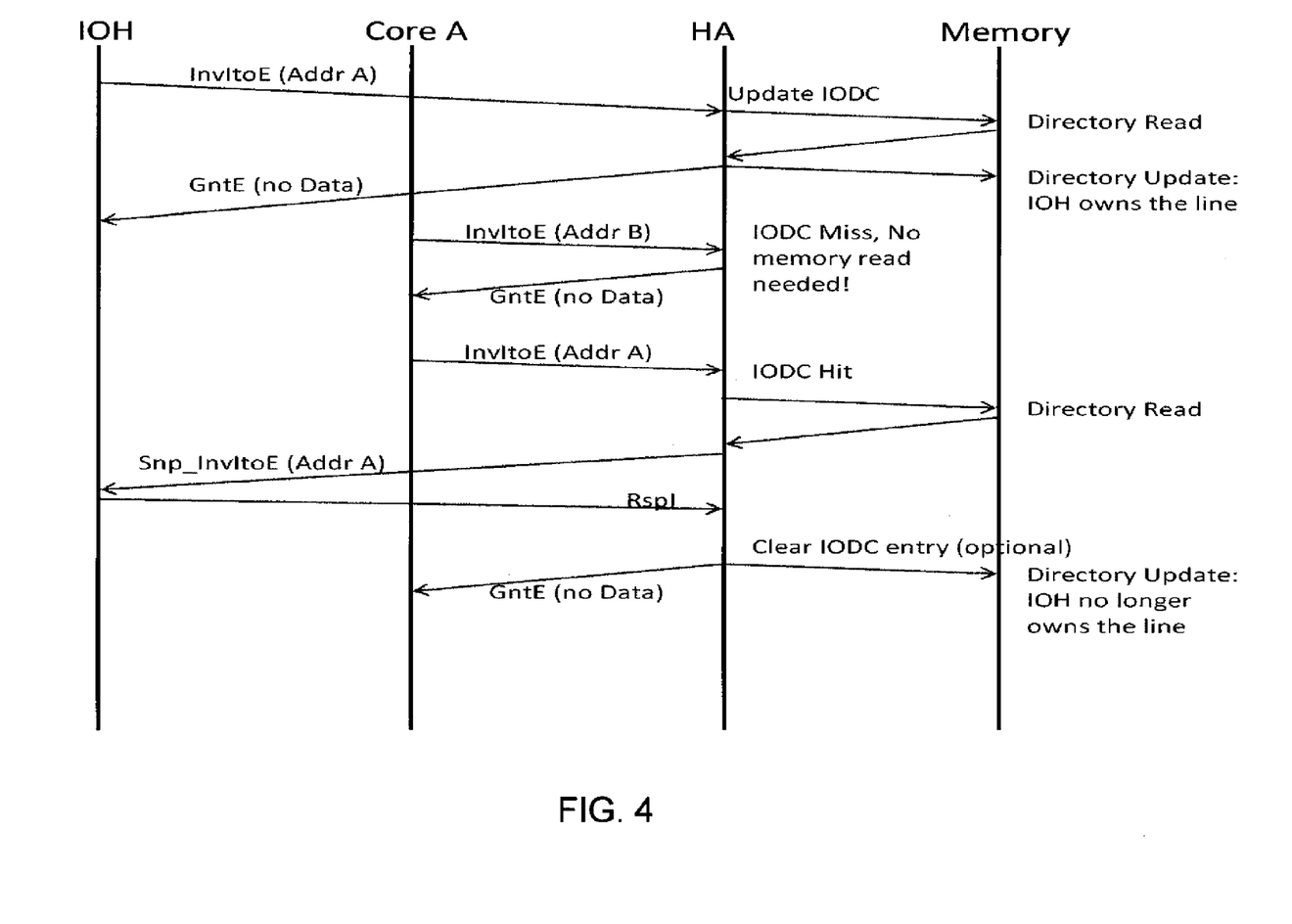
FIG. 4 is a timing diagram of cache coherency operations in accordance with an embodiment of the present invention.

Referring now to FIG. 4, shown is a timing diagram of cache coherency operations in accordance with an embodiment of the present invention. As shown in FIG. 4, various transactions are initiated and handled by different agents of a system. Assume for purposes of discussion that the system of FIG. 4 is a single processor system (although it may be a multi-core processor) having a single I/O hub. In addition to a processor, which can be represented by a core (core A) and a home agent, the system may further include at least one I/O device coupled to the processor via an I/O hub (and represented in the illustration of FIG. 4 as the IOH), and a memory, which may be coupled directly to the processor.

As seen in FIG. 4, the I/O device may seek ownership of data present at a first address (address A), e.g., via an InvItoE transaction. This transaction may be received by the home agent, which may update the IODC accordingly to identify that this address is to be owned by the I/O device. Furthermore, the home agent may forward the request along to memory. The memory may perform a directory read, which indicates that the line is not currently owned, and in turn update its directory to indicate ownership of the data at the requested address by the I/O device. Responsive to the directory read, the home agent may forward along a message to the I/O device. In some embodiments this response message may more specifically be an exclusive grant message which is sent to the device (without any return of data).

As further seen in FIG. 4, at a later time a local core (e.g., core A) seeks ownership of data present at a different address (e.g., address B). This request for ownership may also be via an InvItoE request to the home agent. Because this request misses in the IODC, the home agent may directly send a grant message back to the core. Thus because the home agent can determine by the miss in the IODC that the requested data is not owned by an I/O device, the need to forward the request to memory to check the directory there can be avoided, reducing interconnect bandwidth and also reducing latency.

Assume further that at a later time the local core issues a request for ownership of the information present at address A, which can be assumed to still be owned by the I/O device. Accordingly, a hit occurs in the IODC and thus a conflict has been determined. In various systems, different conflict resolution mechanisms can take effect depending on a given cache coherency protocol of the system. For purposes of discussion here, it may be assumed that the home agent performs various operations to resolve the conflict and resulting in the I/O device no longer owning the identified memory location.

Specifically, as shown in FIG. 4, the home agent issues a to read the directory, which confirms that I/O device still owns the data at address A. Accordingly, the home agent may send an invalidation message, e.g., a snoop invalidation message (e.g., Snp_InvItoE) to the I/O device. Responsive to receipt of this message, the I/O device may invalidate its copy of the data at this location and send a response back to the home agent, indicating successful invalidation (e.g., a RspI).

Accordingly, at this time the home agent can grant access to the requested location to the core. Thus as seen in FIG. 4, the home agent can forward a grant message (without data) to the local core to indicate it now has ownership of the requested location. In addition, the home agent can (optionally) remove the previous entry from the IODC corresponding to this location. In addition, the home agent can send an update message back to memory indicating that the I/O device no longer owns the location (and also updating ownership of the line to be with the core). While shown with this particular implementation in the embodiment of FIG. 4, understand the scope of the present invention is not limited in this regard.

Figure 5:
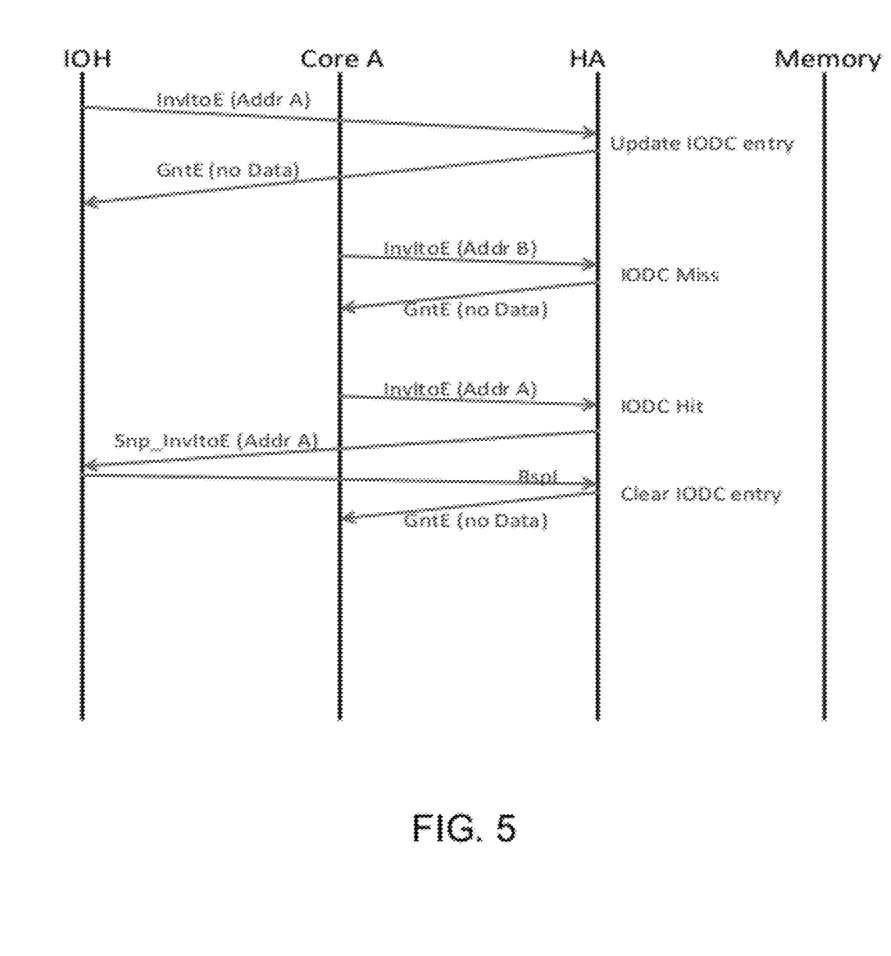
FIG. 5 is a timing diagram of cache coherency operations in accordance with another embodiment of the present invention.

As discussed above, in other embodiments an in-memory directory can be avoided when an IODC includes information to handle coherency operations. In such embodiments, directory update messages between the home agent and memory can be avoided. Referring now to FIG. 5, shown is a timing illustration of cache coherency operations in an embodiment without an in-memory directory. Like FIG. 4, the operations shown in FIG. 5 may be used to provide ownership of data at a given address (e.g., address A) initially to an I/O device, and then later invalidate that data so that a local core can have access to data at that location. The flow of operations shown in FIG. 5 may proceed substantially similar to that of FIG. 4. However, because the IODC includes the full directory state, there is no need to send directory read and update messages from the home agent to the memory.

Figure 6:
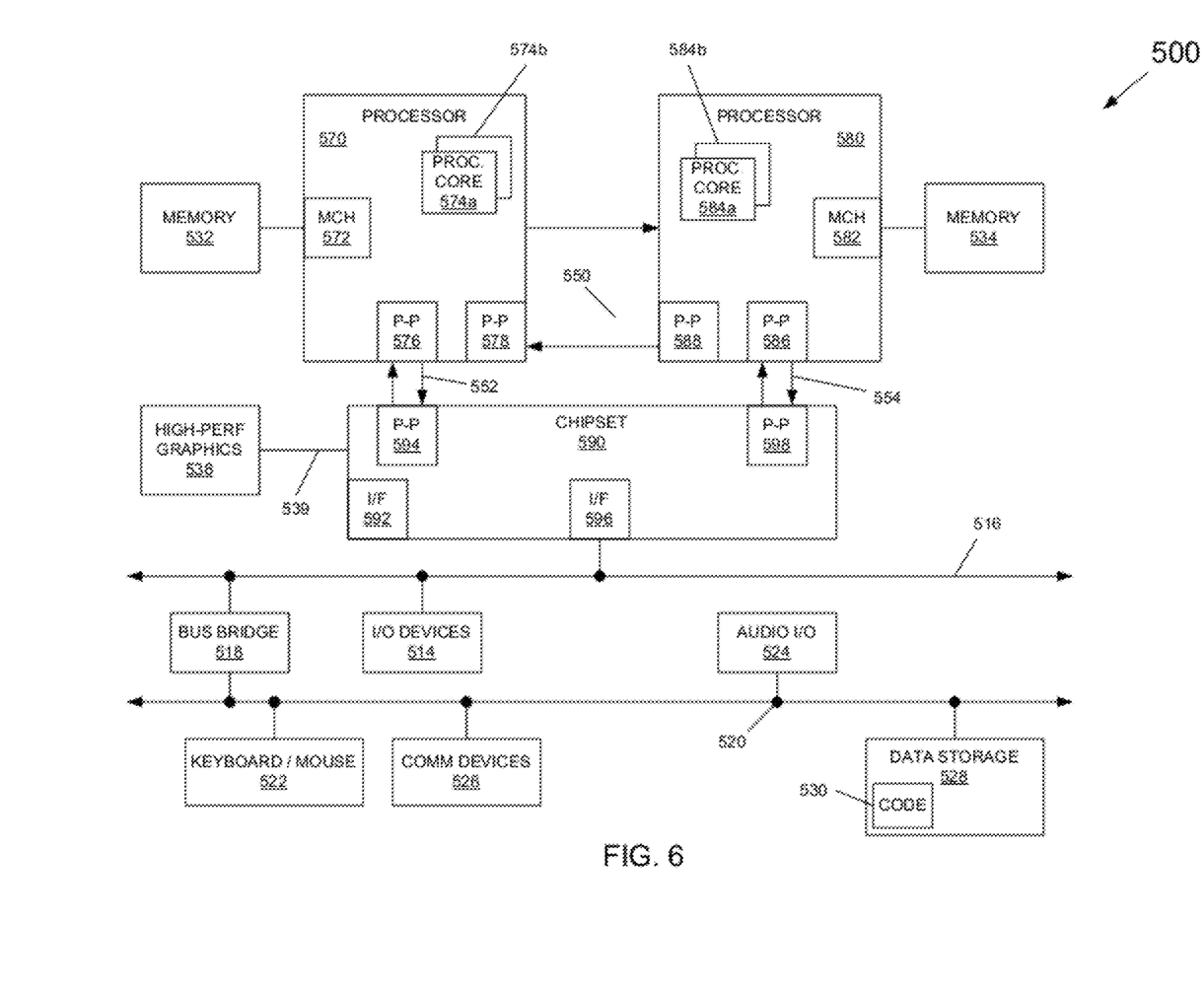
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), although potentially many more cores may be present in the processors. The processors each may include directory caches in accordance with an embodiment of the present invention to reduce the amount of memory transactions used for maintaining coherency. For example, the directory caches can store information regarding portions of the local memory owned by devices coupled to a chipset 590 coupled to the processors.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 6 as a multi-package system (with each package including a multi-core processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor having at least one core and uncore logic, the uncore logic having a home agent to control access to a memory region, the home agent including a directory cache to store only ownership information for a portion of the memory region owned by a peripheral agent coupled to the processor via an input/output hub.

2. The apparatus of claim 1, wherein the memory region includes a directory to indicate ownership of lines within the memory region.

3. The apparatus of claim 2, wherein the home agent is to not send a request to the memory region to read the directory responsive to an access request from the at least one core if an address of the access request misses in the directory cache, and the home agent is to send a grant message to the at least one core responsive to the miss.

4. The apparatus of claim 3, wherein the home agent is to send the request to the memory region to read the directory responsive to the access request if the address of the access request hits in the directory cache.

5. The apparatus of claim 2, wherein the home agent is to insert an entry into the directory cache for a memory region portion responsive to a request for ownership of the memory region portion by the peripheral agent, and to forward the request to the memory region.

6. The apparatus of claim 5, wherein the memory region is to update the directory to indicate ownership of the memory region portion by the peripheral agent.

7. The apparatus of claim 1, wherein the directory cache includes a plurality of entries each corresponding to an available memory transaction from the peripheral agent.

8. The apparatus of claim 7, wherein the directory cache is only to store ownership information for data owned by the input/output hub.

9. A method comprising:
receiving a request for ownership of data associated with an address of a memory coupled to a processor in a home agent of the processor from a peripheral device coupled to the processor;
updating a directory cache of the home agent to indicate the request for ownership, and forwarding a message regarding the request for ownership to the memory, the directory cache to store only ownership information for a portion of the memory owned by the peripheral device; and
updating a directory in the memory to indicate ownership of the data associated with the address by the peripheral device, and forwarding a grant message from the directory cache to the peripheral device.

10. The method of claim 9, further comprising:
receiving a second request for ownership in the home agent from a local core; and
determining whether an address of the second request for ownership from the local core misses in the directory cache, and if so, granting exclusive access to data present at the address of the second request for ownership to the local core, without sending a transaction to the memory.

11. The method of claim 9, further comprising:
receiving a second request for ownership in the home agent from a local core; and
determining whether an address of the second request for ownership from the local core hits in the directory cache, and if so, forwarding a second message regarding the request to the memory.

12. The method of claim 11, further comprising determining whether the address of the second request for ownership hits in a directory of the memory, and if so, handling the request according to a cache coherency protocol for a system including the processor.

13. The method of claim 11, further comprising determining whether the address of the second request for ownership hits in a directory of the memory, and if not, sending a grant of exclusive ownership of data at the address of the second request to the local core.

14. The method of claim 9, further comprising providing a 1:1 correspondence between the directory cache and a number of available transactions from an input/output (I/O) hub coupled to the processor, and only storing information regarding transactions from the I/O hub in the directory cache.

15. A system comprising:
a processor having at least one core and a directory cache, wherein the directory cache is to prevent a memory read to a directory present in a system memory coupled to the processor when an address of the memory access request does not hit in the directory cache, the directory cache to store entries only for ownership of addresses within the system memory by an input/output (IO) device coupled to the processor; and
the system memory coupled to the processor, wherein the system memory comprises a dynamic random access memory (DRAM).

16. The system of claim 15, wherein the processor is to forward the memory read to the directory when the memory access request address hits in the directory cache.

17. The system of claim 15, wherein the memory access request is from a core of the processor.

18. The system of claim 15, wherein when the address of the memory access request does not hit in the directory cache, the processor is to send a grant message to the at least one core responsive to the miss.

19. The system of claim 15, wherein the processor includes an uncore logic, the uncore logic having a home agent, and wherein the directory cache is associated with the home agent.

20. The system of claim 15, wherein the directory cache has a 1:1 mapping between a number of entries in the directory cache and a number of lines that the IO device can own in the DRAM.

* * * * *